US006681036B1

(12) United States Patent
Iwai

(10) Patent No.: US 6,681,036 B1
(45) Date of Patent: Jan. 20, 2004

(54) PAPER MONEY IDENTIFICATION METHOD AND DEVICE

(75) Inventor: Tadahiro Iwai, Hidaka (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 606 days.

(21) Appl. No.: 09/587,237

(22) Filed: Jun. 2, 2000

(30) Foreign Application Priority Data

Jun. 7, 1999 (JP) .......................................... 11-159600

(51) Int. Cl.[7] .................................................. G06K 9/00
(52) U.S. Cl. ...................................................... 382/135
(58) Field of Search ......................... 382/135; 209/534; 356/71; 902/7; 194/206, 207; 271/178, 181

(56) References Cited

U.S. PATENT DOCUMENTS 4,096,991 A * 6/1978 Iguchi ........................ 235/455
4,251,010 A * 2/1981 Schmeykal et al. ........... 221/93
4,348,656 A * 9/1982 Gorgone et al. ............ 382/135
4,386,432 A * 5/1983 Nakamura et al. .......... 382/135
4,628,194 A * 12/1986 Dobbins et al. ............ 235/379
4,790,526 A * 12/1988 Egashira ..................... 271/315
5,014,857 A * 5/1991 Kondo ....................... 209/534
5,547,061 A * 8/1996 Itako et al. ................. 194/203
5,624,017 A * 4/1997 Plesko ........................ 194/207
6,062,369 A * 5/2000 Negishi ...................... 194/207
6,234,294 B1 * 5/2001 Defeo et al. ................ 194/207

FOREIGN PATENT DOCUMENTS

JP 04234394 9/1992
JP 09052793 3/1997
JP 10-255098 * 9/1998

* cited by examiner

*Primary Examiner*—Daniel Mariam
*Assistant Examiner*—Shefali Patel
(74) *Attorney, Agent, or Firm*—Welsh & Katz, Ltd.

(57) ABSTRACT

A paper money identification method and apparatus which can detect when paper money being conveyed slips and identify the paper money according to its slip. A roller pulse synchronized with the rotation of pushing rollers for pushing the paper money to conveying belts is generated by an encode plate and an interrupter, the generated roller pulse and a motor pulse synchronized with the rotation of a motor for driving the conveying belts are compared for their pulse widths, and when there is a difference between their pulse widths, it is detected that the paper money has slipped. And, a feature of the paper money is detected in synchronization with the roller pulse, and the paper money is identified according to the detected feature.

7 Claims, 8 Drawing Sheets

PAPER MONEY IDENTIFICATION METHOD AND DEVICE

BACKGROUND OF THE INVENTION

1. Field of the Invention

The present invention relates to a paper money identification method and apparatus, and more particularly to a paper money identification method and apparatus for detecting a slip of paper money being conveyed and identifying the paper money according to its slip.

2. Description of the Related Art

A paper money identification apparatus used for vending machines and the like is configured to recognize a denomination of an inserted paper money and identifies whether it is real or counterfeit and accept real money of acceptable denomination. The paper money is recognized by detecting its feature by means of an optical sensor, a magnetic sensor or the like and comparing the feature with a previously determined standard value. Generally, paper money is discriminated by sensors disposed in the vicinity of a conveying passage for conveying the paper money to detect a feature of the whole paper money being conveyed.

FIG. 6 is a side view showing a schematic structure of the paper money conveying passage.

As shown in FIG. 6, the paper money conveying passage comprises a conveying belt 121 driven by conveying roller 122 rotated by an unshown motor and other conveying rollers 123, 124 and pushing roller 125 disposed at a position to oppose the conveying belt 121. Paper money 100 entering the paper money conveying passage is pushed against the conveying belt 121 by the pushing roller 125 and conveyed by the conveying belt 121 driven by the rotations of the unshown motor.

The paper money conveying passage is provided with identification sensor (optical sensor, magnetic sensor or the like) 161 for detecting a feature of the paper money 100 so to detect the feature of the paper money 100 while it is being conveyed.

As shown in FIG. 7, in order to detect the feature, a conveyed amount of the paper money 100 is specified by virtue of a pulse synchronized with the rotation of the unshown motor output from an encoder or the like mounted on the motor for driving the conveying belt 121, and output of the identification sensor 161 is compared with the standard value of the position corresponding to the conveyed amount of the paper money 100.

When the paper money 100 being conveyed slips (on the conveying belt 121), however, the conveyed amount of the paper money 100 indicated by the pulse synchronized with the rotations of the motor is different from the actual conveyed amount. And output of the identification sensor 161 obtained at the slipped position as shown in FIG. 8 is of a position different from the standard value to be compared. In other words, the paper money 100 is judged to be counterfeit because it has slipped. And a paper money acceptance rate is lowered.

As technologies to prevent a drop of the paper money acceptance rate due to a slip of the paper money, there are proposed "Paper money identification apparatus" described in Japanese Patent Application Laid-Open Publication No. 6-84043, "Paper money identification apparatus" described in Japanese Patent Application Laid-Open Publication No. 10-255098 and the like.

"Paper money identification apparatus" described in Japanese Patent Application Laid-Open Publication No. 6-84043 determines a measuring zone for detecting a feature of paper money and obtains a maximum value and a minimum value in the measuring zone and their mean value to correct an error resulting from the slip. But, its processing for data measurement and calculation is complex.

"Paper money identification apparatus" described in Japanese Patent Application Laid-Open Publication No. 10-255098 normalizes the obtained feature in the paper money conveying distance to correct an error resulting from a slip of the paper money. But, the paper money conveying distance is measured by a pulse encoder mounted on the motor, so that no measures can be taken if the pulse as shown in FIG. 8 deviates from the actual conveying distance.

As described above, the feature of the paper money is detected by a variety of sensors to discriminate the paper money, but when the paper money slips during its transfer, the comparison between the detected feature and the standard value to be compared corresponds to the comparison of the feature of the paper money at a different position with the standard value, resulting in judging the paper money as a counterfeit money. Therefore, the paper money acceptance rate is lowered.

There is also proposed a technology to deal with a slip of the paper money during its transfer but its processing is complicated, and it sometimes cannot detect a slip of the paper money depending on a situation that the paper money has slipped.

SUMMARY OF THE INVENTION

Under the circumstances described above, it is an object of the invention to provide a paper money identification method and apparatus which can detect the occurrence of a slip when a paper money slips during its transfer and discriminate the paper money according to the slip of the paper money.

To achieve the aforesaid object, the invention comprises a paper money identification method for identifying paper money by conveying an inserted paper money along a paper money conveying passage by means of conveying belts and reading identification data of the paper money by a paper money identification sensor disposed above the paper money conveying passage, wherein the conveying belts are driven by a conveying motor, the paper money being conveyed along the paper money conveying passage is pushed by pushing rollers, a displaced conveying position of the paper money is detected according to a motor signal synchronized with the rotation of the conveying motor and a roller signal synchronized with the rotation of the pushing rollers, and the identification data is corrected according to the detected displaced conveying position of the paper money to identify the paper money.

The invention also comprises a method wherein the motor signal and the roller signal are pulse signals, and the detection is performed by comparing pulse widths of the motor and roller signals.

The invention further comprises a paper money identification method for identifying paper money by conveying an inserted paper money along a paper money conveying passage by means of conveying belts and reading identification data of the paper money by a paper money identification sensor disposed above the paper money conveying passage, wherein the conveying belts are driven by a conveying motor, the paper money being conveyed along the paper money conveying passage is pushed by pushing rollers, the identification data is sampled according to a roller signal synchronized with the rotation of the pushing rollers, and the paper money is identified according to the sampled identification data.

The invention further composes a paper money identification apparatus for identifying paper money by conveying an inserted paper money along a paper money conveying passage by means of conveying belts and reading identification data of the paper money by a paper money identification sensor disposed above the paper money conveying passage, comprising: a conveying motor for driving the conveying belts; pushing rollers which rotate in contact with the paper money being conveyed along the paper money conveying passage; and detection means for detecting a displaced conveying position of the paper money according to a motor signal synchronized with the rotation of the conveying motor and a roller signal synchronized with the rotation of the pushing rollers, wherein the identification data is corrected according to a detection output of the detection means to identify the paper money.

The invention also directed to the invention wherein the motor signal and the roller signal are pulse signals, and the detection means detects a difference of pulse width between the motor signal and the roller signal as a displacement of transfer of the paper money.

The invention further comprises a paper money identification apparatus for identifying paper money by conveying an inserted paper money along a paper money conveying passage by means of conveying belts and reading identification data of the paper money by a paper money identification sensor disposed above the paper money conveying passage, comprising: a conveying motor for driving the conveying belts; pushing rollers which rotate in contact with the paper money being conveyed along the paper money conveying passage; and sampling means for sampling the identification data according to a roller signal synchronized with the rotation of the pushing rollers, wherein identification of the paper money is carried out according to the identification data sampled by the sampling means.

The invention is also directed to the sampling means which comprises an encoder for generating a pulse signal synchronized with the rotation of the pushing rollers.

According to the invention, the motor pulse synchronized with the rotation of the motor for driving the conveying belts and the roller pulse synchronized with the rotation of the pushing rollers for pushing the paper money to the conveying belts are compared for their pulse widths and when there is a difference between the pulse widths, it is detected that the paper money has slipped. Therefore, a slip of the paper money can be detected without fail.

And, the feature of the paper money is detected in synchronization with the roller pulse and the paper money is identified according to the feature detected. Therefore, even when the paper money slips, its feature corresponding to a predetermined position of the paper money can be detected, and misidentification due the slip of the paper money can be reduced. And, a paper money reception rate can be improved.

DESCRIPTION OF THE PREFERRED EMBODIMENTS

One embodiment of a paper money identification method and apparatus according to the present invention will be described in detail with reference to the accompanying drawings.

Figure 1:
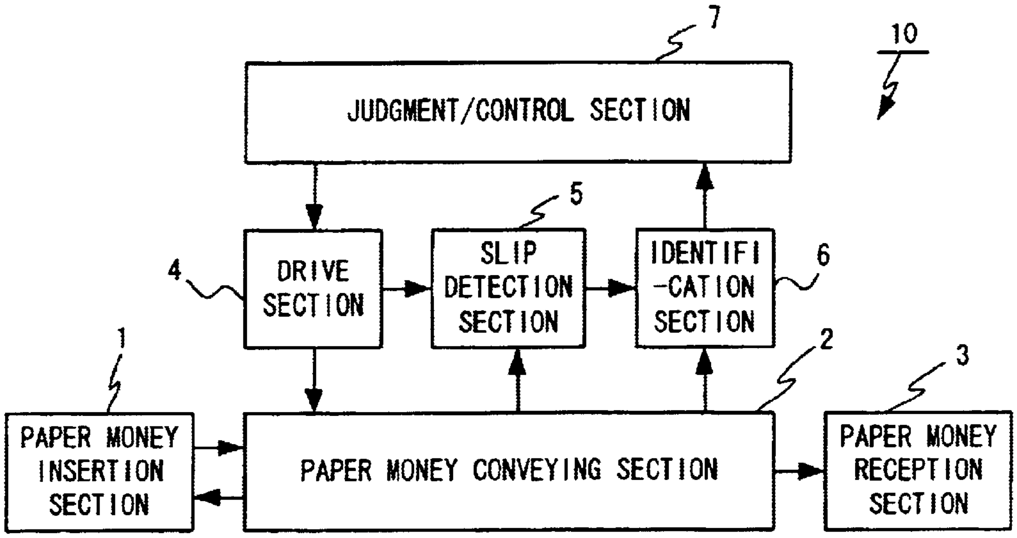
FIG. 1 is a block diagram showing a schematic structure of a paper money identification apparatus.

FIG. 1 is a block diagram showing a schematic structure of a paper money identification apparatus.

It is seen in the drawing that paper money identification apparatus 10 comprises paper money insertion section 1, paper money conveying section 2, paper money reception section 3, drive section 4, slip detection section 5, identification section 6, and judgment/control section 7. The paper money insertion section 1 is a port for inserting paper money into the paper money identification apparatus 10. The paper money conveying section 2 conveys the paper money inserted through the paper money insertion section 1 to the paper money reception section 3. The paper money reception section 3 receives and accumulates the paper money conveyed by the paper money conveying section 2.

The drive section 4 comprises an unshown motor and drives the paper money conveying section 2 according to the control by the judgment/control section 7. The slip detection section 5 detects a slip of the paper money being conveyed on the basis of a pulse signal synchronized with rotations of the unshown motor of the drive section 4 and a pulse signal (to be described in detail afterward) output by the paper conveying section 2. And the identification section 6 detects a feature of the paper money conveyed by the paper money conveying section 2. The judgment/control section 7 judges whether the inserted paper money is real or counterfeit on the basis of the results of identification by the identification section 6, conveys the paper money judged as a true paper money to the paper money reception section 3, and controls the drive section 4 so to return the paper money judged to be counterfeit to the paper insertion section 1.

Now, the paper money conveying section 2 will be described.

Figure 2:
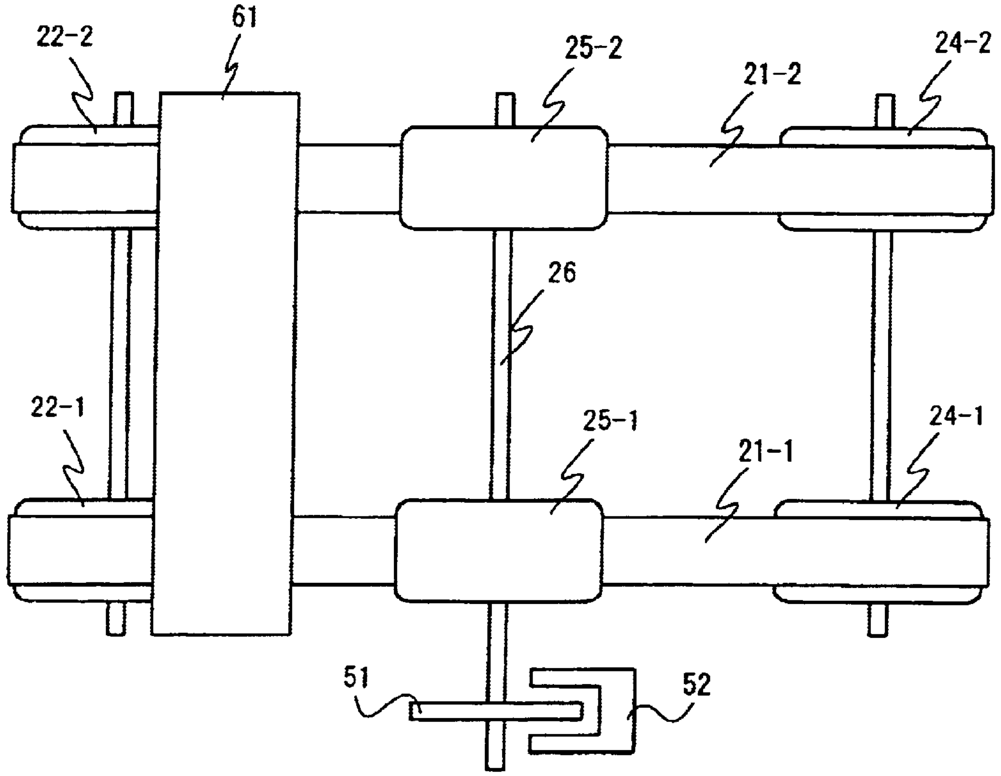
FIG. 2 is a top view showing a schematic structure of paper money conveying section 2.
Figure 3:
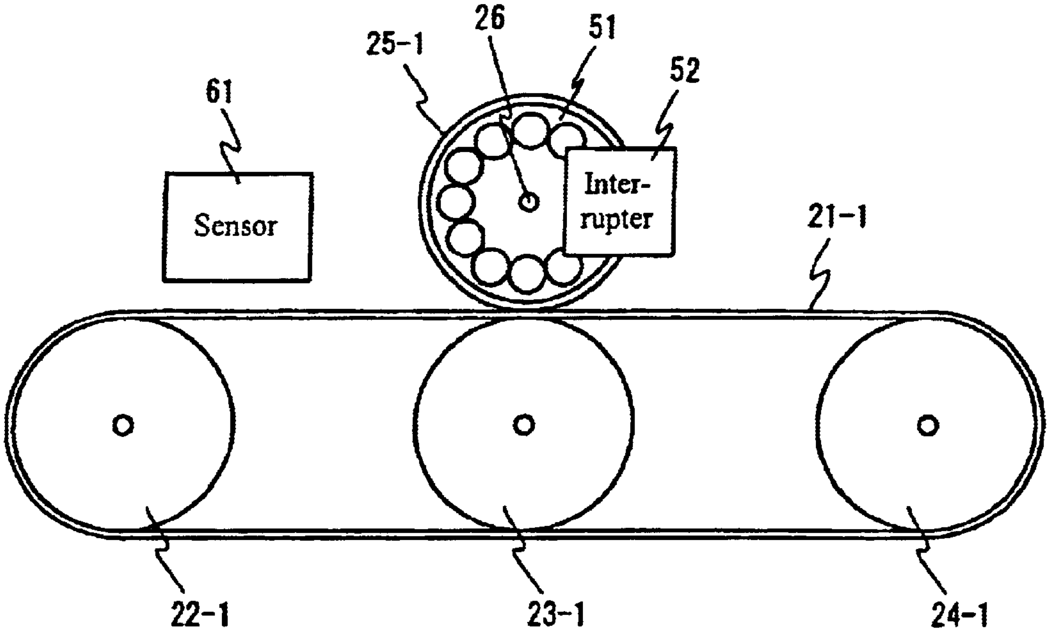
FIG. 3 is a side view showing a schematic structure of the paper money conveying section 2.

FIG. 2 and FIG. 3 are a top view and a side view showing a schematic structure of the paper money conveying section 2.

It is seen in the figures that the paper money conveying section 2 comprises conveying rollers 22-1, 22-2, 23-1, 23-2, 24-1, 24-2, conveying belts 21-1, 21-2 put around the conveying rollers, and pushing rollers 25-1, 25-2. The conveying rollers 22-1, 22-2 are rotated by the unshown motor of the drive section 4 so to move the conveying belts 21-1, 21-2. This paper money conveying passage 2 conveys the paper money by the operation of the conveying belts 21-1, 21-2. The paper money being conveyed is pushed against the conveying belts 21-1, 21-2 by the pushing rollers 25-1, 25-2.

Shaft 26 of the pushing rollers 25-1, 25-2 is provided with encode plate 51, which cooperate with interrupter 52 to form an encoder so to output a pulse signal synchronized with the rotations of the pushing rollers 25-1, 25-2. The encoder comprising the encode plate 51 and the interrupter 52 is a part of the slip detection section 5.

Identification sensor 61 which comprises an optical sensor, a magnetic sensor or the like and is a part of the identification section 6 is disposed in the vicinity of the conveying belts 21-1, 21-2. The identification sensor 61 detects a feature of paper money being conveyed by the conveying belts 21-1, 21-2.

Now, detection of a slip of paper money by the slip detection section 5 will be described.

A slip of paper money is detected by comparing a pulse signal (hereinafter called the motor pulse) output from the encoder of the unshown motor of the drive section 4 with a pulse signal (hereinafter called the roller pulse) output from the encoder comprising the encode plate 51 and the interrupter 52. When paper money slips, there is an error between a position of the paper money indicated by the motor pulse and the actual position of the paper money. But, there is not any error between the position of the paper money indicated by the roller pulse and the actual position of the paper money because the roller pulse is synchronized with the rotations of the pushing rollers 25-1, 25-2 pushing the paper money. Therefore, a slip of the paper money can be detected by comparing the motor pulse width with the roller pulse width.

Figure 4:
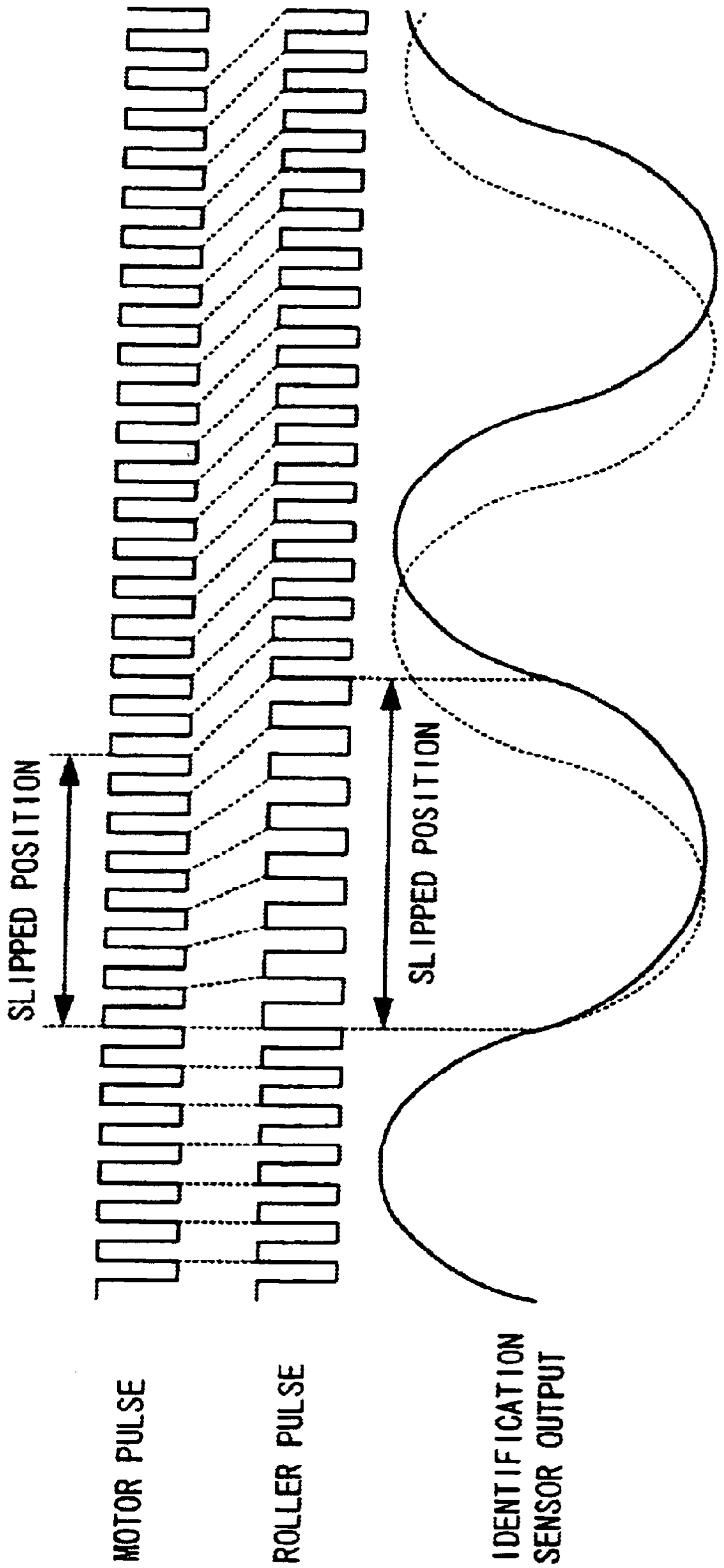
FIG. 4 is a diagram illustrating a method for detecting a slip of paper money.

For example, the motor pulse is a pulse signal synchronized with the position of the paper money, namely the output (indicated by the broken line in the drawing) of the identification sensor 61, when the paper money does not slip as shown in FIG. 4, so that it is a pulse signal having a given width at all times. Meanwhile, the roller pulse is synchronized with the position of the paper money, and when the paper money slips, it is a pulse signal synchronized with the position of the paper money, namely the output (indicated by the solid line in the drawing) of the identification sensor 61, so that the pulse width becomes large when the paper money slips. Therefore, the occurrence of a difference between the motor pulse width and the roller pulse width can be detected as the occurrence of a slip of paper money.

It is apparent from FIG. 4 that when the paper money slips, identification data after the occurrence of slip, which also includes a state that the paper money does not slip, deviates totally in view of the motor pulse determined as reference. Therefore, when the slip detection section 5 detects that the paper money has slipped, it is necessary to correct the identification data obtained by the identification section 6. This identification data can be corrected by various methods. For example, the standard value compared with the identification data according to a state that the paper money has slipped (a difference between the motor pulse width and the roller pulse width) is changed or when a duration (a distance that the paper money has moved) that the paper money has slipped is within a predetermined time, the identification data of the pertinent position is ignored.

Now, a method of identifying paper money depending on its slip will be described.

Figure 5:
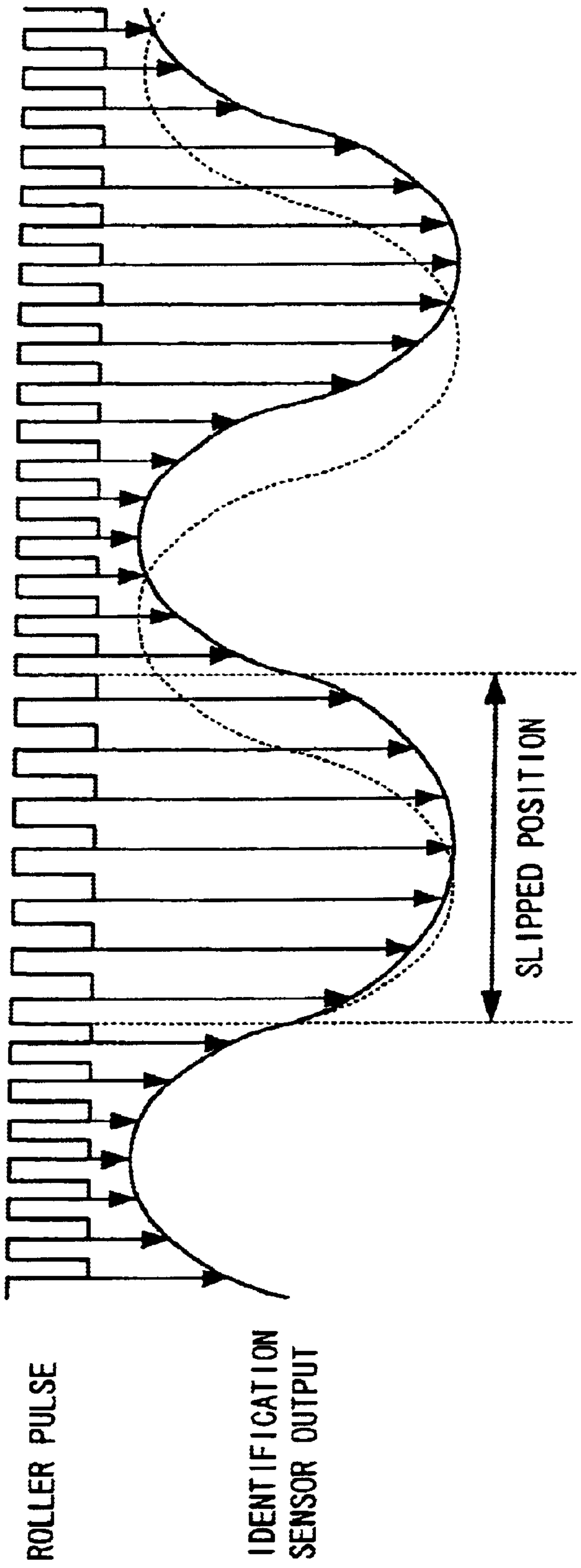
FIG. 5 is a diagram illustrating an identification method to deal with a slip of paper money.
Figure 6:
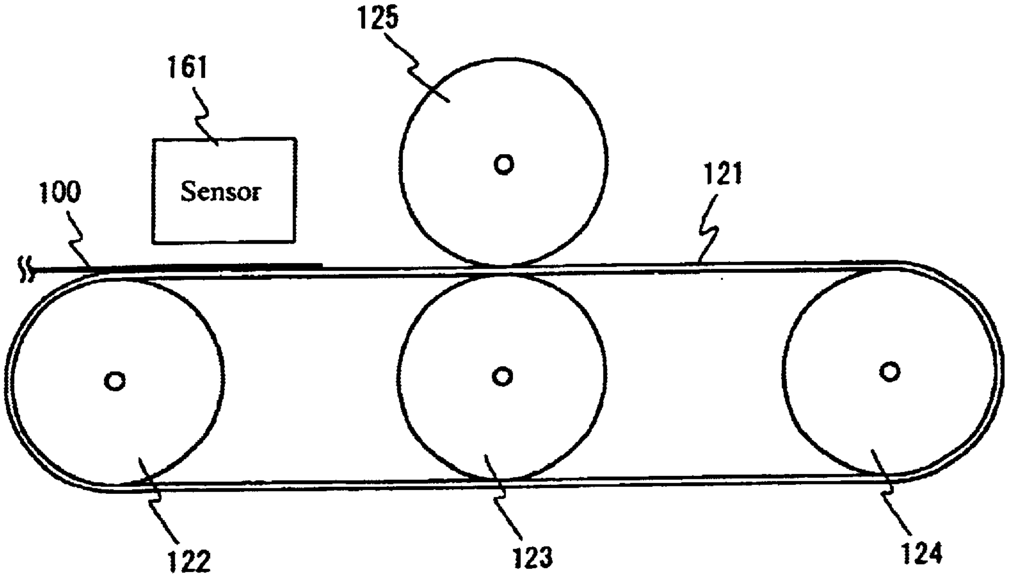
FIG. 6 (PRIOR ART)
FIG. 6 is a side view showing a schematic structure of a paper money conveying passage of a conventional paper money identification apparatus.
Figure 7:
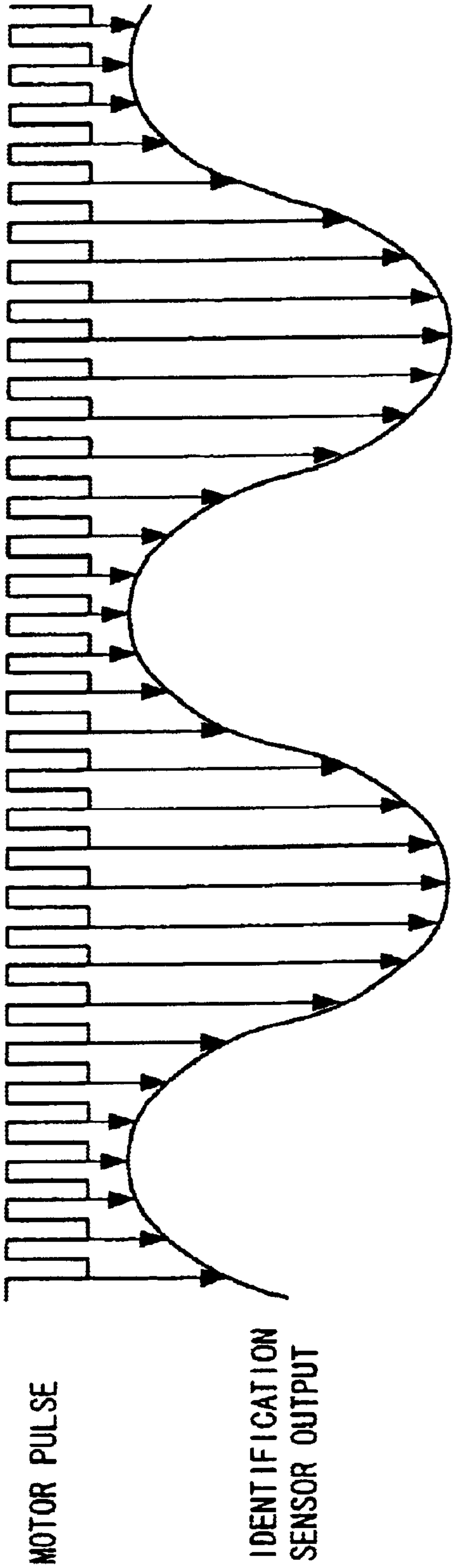
FIG. 7 (PRIOR ART)
FIG. 7 is a diagram showing a detection method of a feature in the conventional paper money identification apparatus.
Figure 8:
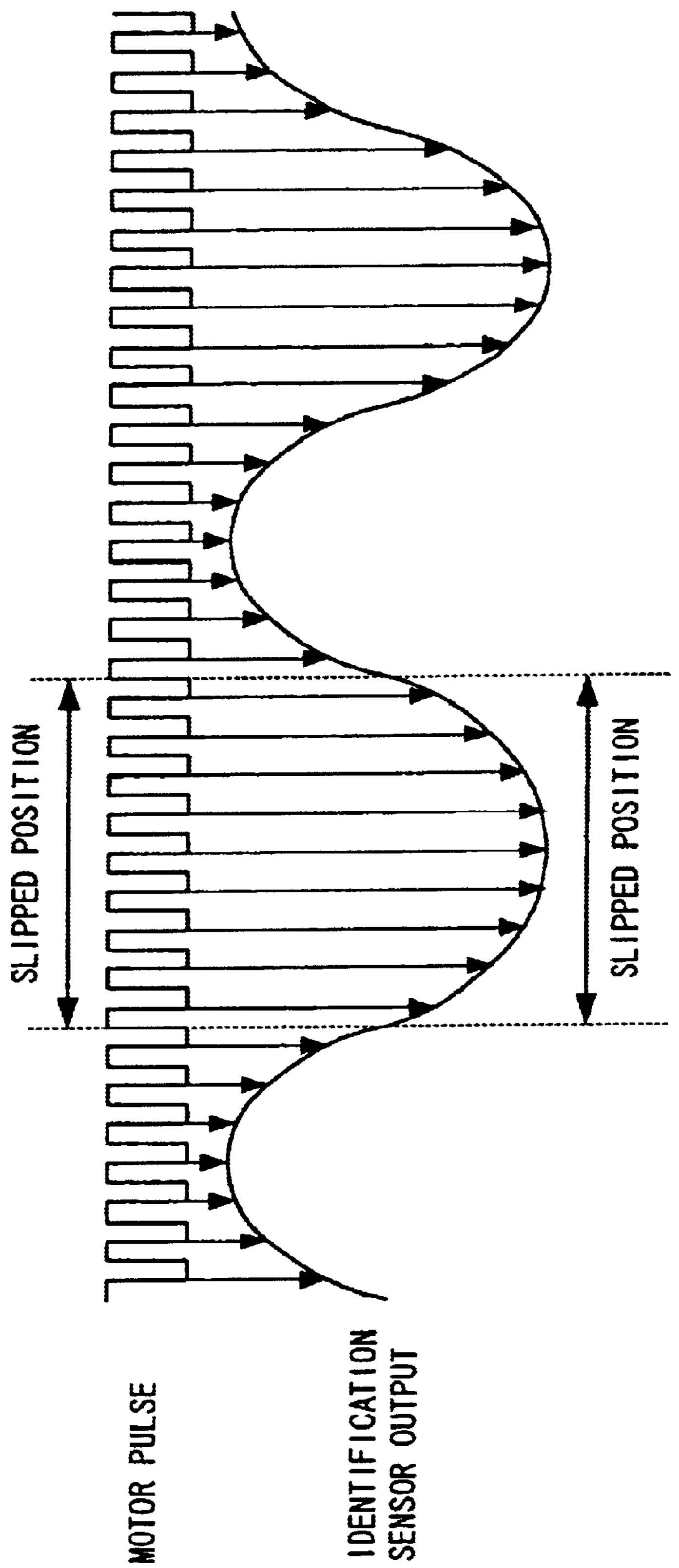
FIG. 8 is a diagram illustrating a cause of misidentification due to a slip of paper money.

As described above, the roller pulse is a signal synchronized with the rotations of the pushing rollers 25-1, 25-2. Specifically, the roller pulse corresponds to a conveyed distance of the paper money, so that output (feature) of the identification sensor 61 is obtained in synchronization with the roller pulse as shown in FIG. 5 and compared with the standard value previously determined by the judgment/control section 7 (in the same way as the conventional processing of identification data obtained in synchronization with the motor pulse). Thus, the feature of the appropriate position of the paper money and the standard value can be compared in case of a slip of the paper money.

What is claimed is:

1. A paper money identification method for identifying paper money by conveying an inserted paper money along a paper money conveying passage by means of conveying belts and reading identification data of the paper money by a paper money identification sensor disposed above the paper money conveying passage, wherein:

the conveying belts are driven by a conveying motor, the paper money being conveyed along the paper money conveying passage is pushed by pushing rollers which are not driven directly by the conveying motor, a displaced conveying position of the paper money is detected according to a motor signal synchronized with the rotation of the conveying motor and a roller signal synchronized with the rotation of the pushing rollers, and the identification data is corrected according to the detected displaced conveying position of the paper money to identify the paper money.

2. The paper money identification method according to claim 1, wherein the motor signal and the roller signal are pulse signals, and the detection is performed by comparing pulse widths of the motor signal and the roller signal.

3. A paper money identification method for identifying paper money by conveying an inserted paper money along a paper money conveying passage by means of conveying belts and reading identification data of the paper money by a paper money identification sensor disposed above the paper money conveying passage, wherein:

the conveying belts are driven by a conveying motor, the paper money being conveyed along the paper money conveying passage is pushed by pushing rollers which are not driven directly by the conveying motor, the identification data is sampled according to a roller signal synchronized with the rotation of the pushing rollers, and the paper money is identified according to the sampled identification data.

4. A paper money identification apparatus for identifying paper money by conveying an inserted paper money along a paper money conveying passage by means of conveying belts and reading identification data of the paper money by a paper money identification sensor disposed above the paper money conveying passage, comprising:

a conveying motor for driving the conveying belts, pushing rollers which are in contact with the paper money being conveyed along the paper money conveying passage and which rotate long with the movement of the paper money, and detection means for detecting a displaced conveying position of the paper money according to a motor signal synchronized with the rotation of the conveying motor and a roller signal synchronized with the rotation of the pushing rollers, wherein the identification data is corrected according to a detection output of the detection means to identify the paper money.

5. The paper money identification apparatus according to claim 4, wherein the motor signal and the roller signal are pulse signals, and the detection means detects a difference of pulse width between the motor signal and the roller signal as a displacement of transfer of the paper money.

6. A paper money identification apparatus for identifying paper money by conveying an inserted paper money along a paper money conveying passage by means of conveying belts and reading identification data of the paper money by a paper money identification sensor disposed above the paper money conveying passage, comprising:

a conveying motor for driving the conveying belts;

pushing rollers which are in contact with the paper money being conveyed along the paper money conveying passage and which rotate along with the movement of the paper money; and sampling means for sampling the identification data according to a roller signal synchronized with the rotation of the pushing rollers, wherein identification of the paper money is carried out according to the identification data sampled by the sampling means.

7. The paper money identification apparatus according to claim 6, wherein the sampling means comprises an encoder for generating a pulse signal synchronized with the rotation of the pushing rollers.

* * * * *